United States Patent [19]

Shimizu

[11] Patent Number: 4,607,381
[45] Date of Patent: Aug. 19, 1986

[54] SIGNAL MIXING CIRCUIT

[75] Inventor: Yoshio Shimizu, Kanagawa, Japan

[73] Assignee: Sony Corporation, Tokyo, Japan

[21] Appl. No.: 657,815

[22] Filed: Oct. 5, 1984

[51] Int. Cl.$^4$ ............................................... H04H 5/00
[52] U.S. Cl. ......................................... 381/10; 381/13
[58] Field of Search ....................... 307/490, 498, 529; 328/142, 158, 160; 381/10, 11, 13

[56] References Cited

U.S. PATENT DOCUMENTS

| 3,673,342 | 6/1972 | Muller | 381/10 |
| 3,943,293 | 3/1976 | Bailey | 381/10 |
| 3,952,161 | 4/1976 | Gilbert et al. | 381/10 |
| 4,088,902 | 5/1978 | Buchanan et al. | 381/10 |
| 4,356,350 | 10/1982 | Ienaka | 381/10 |
| 4,449,229 | 5/1984 | Mori | 307/529 |

FOREIGN PATENT DOCUMENTS

| 55-86235 | 6/1980 | Japan | 381/10 |
| 59-119937 | 7/1984 | Japan | 381/10 |

Primary Examiner—Forester W. Isen
Attorney, Agent, or Firm—Lewis H. Eslinger; Alvin Sinderbrand

[57] ABSTRACT

A signal mixing circuit for blending two signals, such as left and right channel FM stereo signals, blends the two signals at each of two outputs in response to a variable control voltage, which acts upon a transistor network connected between the two signal paths. When the variable control voltage is determined by an amplitude detector connected in a conventional FM stereo receiver, the output signals will be blended to a greater degree when the received signal strength of the broadcast FM signal becomes weaker. In a further embodiment, capacitors are added to inhibit high-frequency components of one channel and to add in high-frequency components of another channel thereby eliminating and cancelling the noise components normally present in the respective signals and improving the S/N ratio.

18 Claims, 9 Drawing Figures

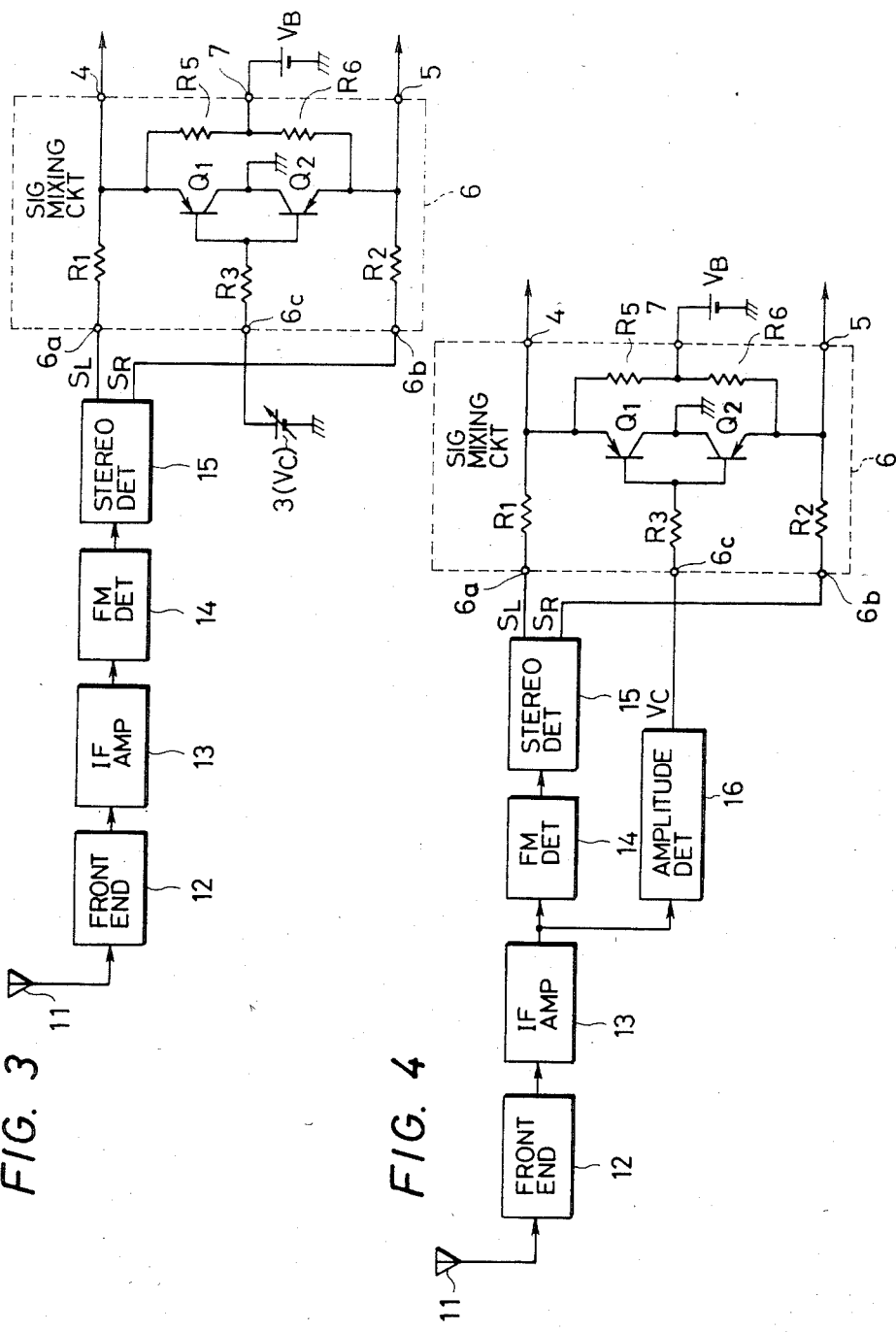

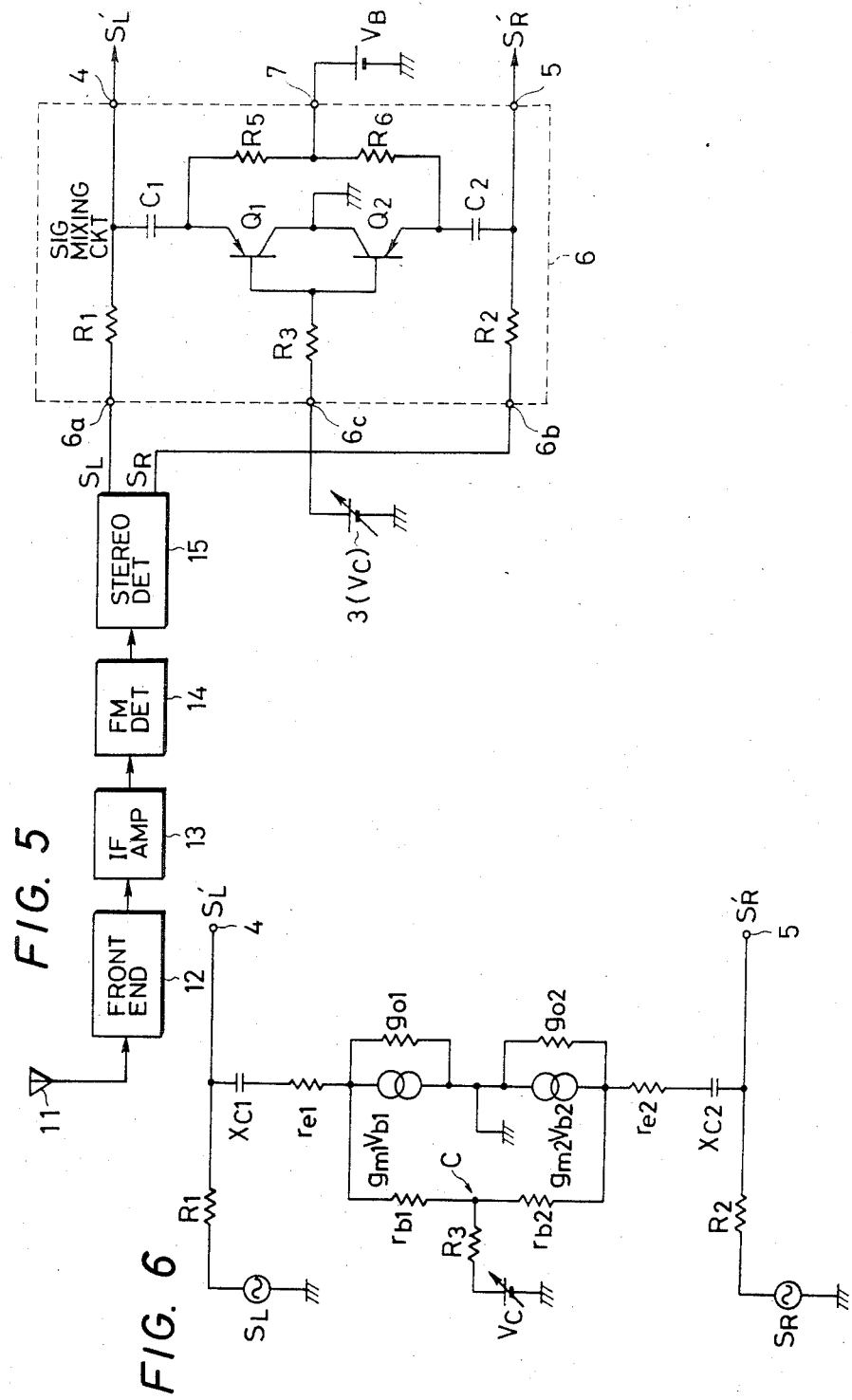

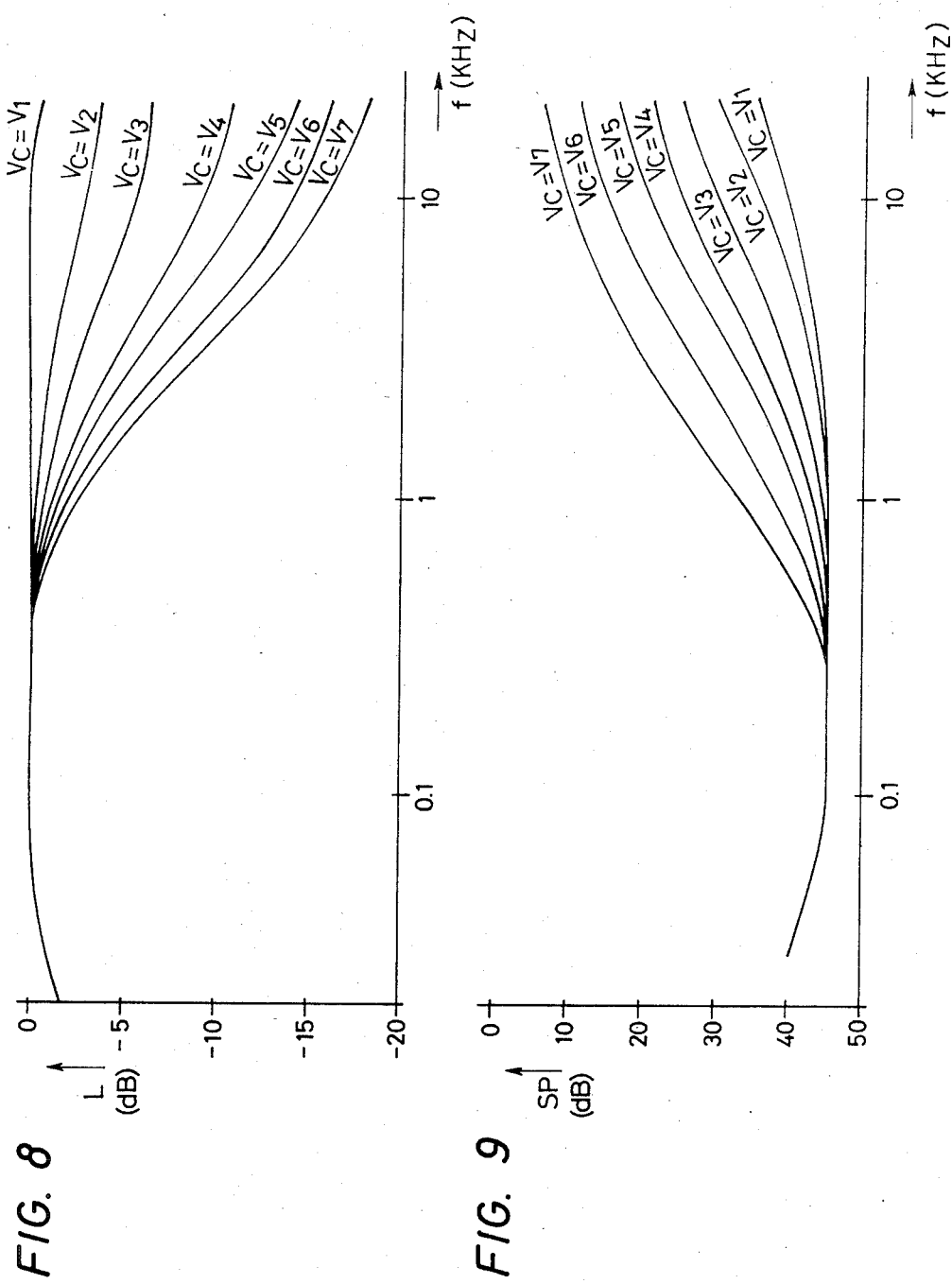

SIGNAL MIXING CIRCUIT

BACKGROUND OF THE INVENTION

1. Field of the Invention

The present invention relates generally to a signal mixing circuit and, more specifically, to a signal mixing circuit for use with an FM stereo receiver for producing output signals having an improved signal-to-noise ratio.

2. Description of the Prior Art

As is known, the operation of an FM radio receiver will be adversely affected and the signal-to-noise (S/N) ratio of the output signal will be objectionably reduced when the electrical field strength of the broadcast FM signal received by the receiver decreases or is weakened. Thus, in the case of an FM receiver employed in an automobile, the location of which will change over a relatively broad area, the intensity of the field strength of the broadcast FM signal received by the moble receiver will vary accordingly, and the quality of the output signal produced by the FM receiver will suffer significant degradation. This problem is exacerbated in the case of FM stereophonic signals received at an FM receiver, in which the level of the noise component contained in the left and right channel audio output signals derived from the FM receiver will increase considerably, and the quality of each of the left and right channel output signals then becomes more obviously deteriorated when the field strength of the received FM stereo signal becomes weaker.

There have been proposed numerous solutions to this S/N ratio problem, one of which is to combine the left and right channel audio output signals in order to cancel the noise components in such a fashion as to produce a blended audio output signal with the desired improved signal to noise ratio. Various problems arise in this approach in that typically the signal combination occurs at all times, thereby being unnecessary when the S/N ratio is high. Additionally, it is difficult to blend the signals continuously and gradually and to decrease the level of one of the blended channels while simultaneously increasing the lever of the other channel, which is necessary in order to produce audio signals that do not vary in level so abruptly that the resultant sounds are annoying.

OBJECTS AND SUMMARY OF THE INVENTION

Accordingly, it is an object of the present invention to provide a signal mixing circuit, which can eliminate the above-noted defects inherent in the prior art.

Another object of this invention is to provide a mixing circuit for use as an FM stereo noise reduction circuit, which mixes the left and right channel output signals with each other to produce a pair of blended output signals, with the mixing or blending being controlled in response to a single control signal, whereby the level of one of the output audio signals varies gradually to increase or decrease and, simultaneously, the level of the other audio output signal varies inversely to respectively decrease or increase.

A further object of this invention is to provide a signal mixing circuit suitable for use in an FM receiver for receiving FM stereo signals, whereby the left and right channel audio output signals are mixed with each other in order to produce blended left and right channel audio output signals having an improved signal-to-noise ratio, when the field strength of the received FM stereo signal as received by the FM receiver is initally weak, or which varies to a marginally unacceptable weaker level.

In accordance with an aspect of the present invention, a signal mixing circuit is provided having a first current amplifier device connected to ground and to one of the input signals through a resistive elment and is responsive to a control voltage source output, a second current amplifying device connected to ground and connected to the other of the input signals through another resistive element and is responsive to the signal from the same control voltage source, with the outputs of the signal mixing circuit being taken from the connection of the respective current amplifying devices and their respective resistive elements, so that any noise components present in the two input signals will not appear in the corresponding respective output signals.

Accordingly, a signal mixing circuit is provided that includes a first transistor having either its collector or emitter grounded and the other of the two connected through a first resistor to the first signal source, which may be the output of the stereo detector of an FM stereo receiver, and the base of the first transistor being connected through another resistor to the output of a controllable voltage source. The inventive mixing circuit includes a second transistor having one of its collector and emitter electrodes grounded with the other of the two being connected through another resistor to a second signal source, which would represent the other audio output channel from the stereo detector. The base of the second transistor is connected to the base of the first transistor through the third resistor to the control voltage source. The outputs of this mixing circuit are taken at the connection points between the selected ones of the collectors and emitters of the two transistors and their respective resistance elements. Thus, according to the signal mixing circuit provided by the present invention, the first input signal supplied from the first signal source is fed to the first output terminal and a portion thereof is also fed through the mixing circuit to be blended with the second input signal that is supplied from the second signal source, and the second input signal is transmitted to the second output terminal and a portion thereof is also fed through the mixing circuit to the first output terminal to be blended with the first input signal, all such blending taking place when the transistors of the mixing circuit are made conductive.

The levels of the first and second input signals fed to the first and second output terminals are determined by the impedance of the first transistor, measured at the collector or emitter electrode, and the impedance of the second transistor measured at the same respective point, and the levels of the first and second input signals which are mixed with the second and first input signals fed to the second and first output terminals, respectively, are determined by the impedances of the first and second transistors measured at their respective bases.

By providing the inventive signal mixing circuit for use in FM stereo noise reduction, as described above, the levels of the first and second input signals fed to the respective output terminals and the levels of the second and first input signals, which are to be mixed with the second and first input signals fed to their respective first and second output terminals, are independently controlled in response to a control voltage fed to the commonly connected base electrodes of the first and second transistors from a control voltage source. More specifically, in regard to the first and second input signals mixed with each other and fed to the first output terminal, the level of the first input signal can be controlled to gradually increase or decrease and, simultaneously, the level of the second input signal mixed with the first input signal is also controlled to gradually decrease or increase, respectively. Similarly, for the second and first input signals which are mixed with each other and fed to the second output terminal, the level of the second input signal can be controlled to gradually increase or decrease and, simultaneously, the level of the first input signal mixed with the second input signal is also controlled to decrease or increase respectively.

The present signal mixing circuit is particularly suited for use in an FM stereo receiver that receives broadcast FM stereo signals, which may vary so that the signal strength decreases, in order to mix the left and right channel audio output signals with each other to produce audio output signals having an improved S/N ratio, when the field strength of the FM stereo signal received by the receiver varies to a relatively weaker level.

The above, and other objects, features, and advantages of the present invention will become apparent from the following detailed description of illustrative embodiments thereof to be read in conjunction with the accompanying drawings.

BRIEF DESCRIPTION OF THE DRAWINGS

FIG. 3 is a block diagram of an FM stereo receiver to which is connected the inventive embodiment of FIG. 1;

FIG. 4 is a block diagram of another FM stereo receiver, to which the inventive mixing circuit of FIG. 1 is connected by way of an amplitude detector;

FIG. 5 is a block diagram of an FM stereo receiver to which another embodiment of the signal mixing circuit according to the present invention is connected;

FIG. 6 is a schematic diagram of am equivalent circuit of the inventive signal mixing circuit of FIG. 5;

FIG. 8 is a graphical representation of the high-frequency reducing characteristics of an FM receiver receiving broadcast FM stereo signals to which has been connected the embodiment of the inventive signal mixing circuit, as shown in FIG. 6; and FIG. 9 is a graphical representation of the high-frequency blending characteristic of an FM receiver receiving broadcast FM stereo signals to which has been connected the embodiment of the inventive signal mixing circuit, as shown in FIG. 6.

DETAILED DESCRIPTION OF PREFERRED EMBODIMENTS

Figure 1:
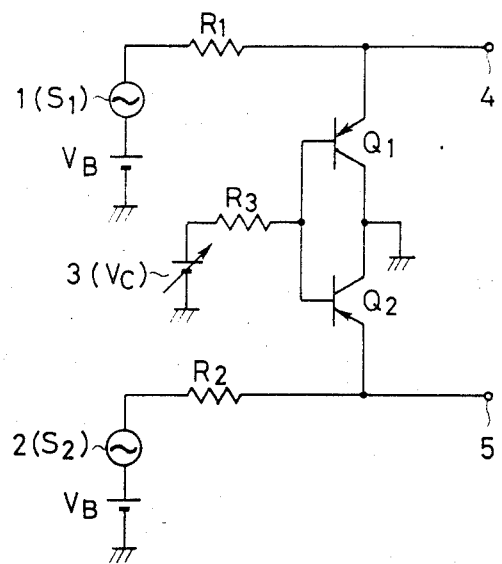
FIG. 1 is a schematic diagram of an embodiment of a signal mixing circuit according to the present invention connected to external signal sources and to a control signal source.

FIG. 1 is a schematic diagram of a signal mixing circuit according to the present invention in which first and second transistors $Q_1$ and $Q_2$ are employed and in which first and second transistors $Q_1$ and $Q_2$ have their collector electrodes connected to ground in order to prevent AC drift and also to assure that the bias of the transistors is principally determined by the DC voltage levels. The emitter electrode of first transistor $Q_1$ is connected through a resistance element $R_1$ to a first signal source 1, which generates a first AC signal $S_1$. The emitter electrode of second transistor $Q_2$ is connected through a resistance element $R_2$ to a second signal source 2, which generates a second AC signal $S_2$. The base electrodes of transistors $Q_1$ and $Q_2$ are connected in common through resistance $R_3$ to a control voltage source 3, which generates a variable control voltage $V_C$. In the generalized circuit of FIG. 1, each of the first and second signal sources 1 and 2 is connected to ground through a source of bias voltage $V_B$. The output signals of the signal mixing circuit of FIG. 1 are taken off at the connection points between the emitters of the transistors and their respective resistances and, specifically, an output terminal 4 is connected at the connection point between the emitter of transistor $Q_1$ and resistance element $R_1$, and an output terminal 5 is connected at the connection point between the emitter of transistor $Q_2$ and resistance element $R_2$. By way of specific example, each of resistance elements $R_1$ and $R_2$ may have a typical resistance of 20 Kohm, the value of resistance $R_3$ may be selected to between 100 Kohms and 220 Kohms, and the value of the biasing voltage $V_B$ may be approximately four volts.

Figure 2:
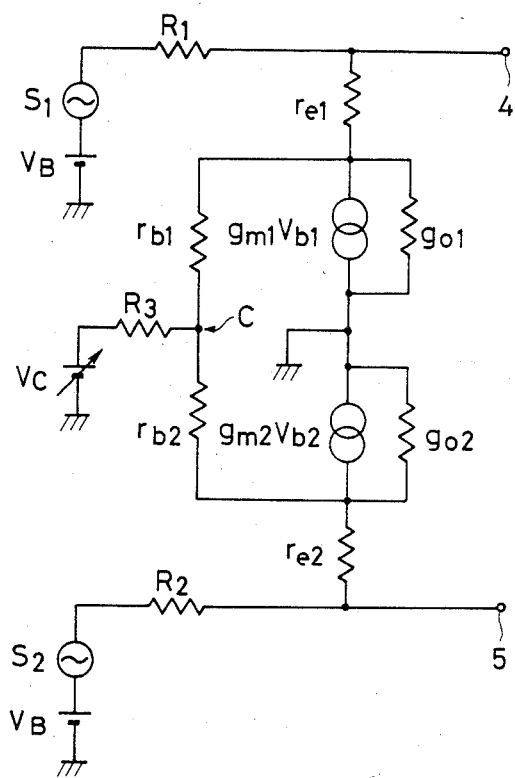
FIG. 2 is, a schematic diagram of an equivalent circuit of the embodiment of FIG. 1.

The equivalent circuit of the signal mixing circuit of FIG. 1 is set forth in FIG. 2, in which it is assumed that first and second transistors $Q_1$ and $Q_2$ have emitter resistances given by $r_{e1}$ and $r_{e2}$, respectively, base resistances $r_{b1}$ and $r_{b2}$, respectively, mutual conductances $g_{m1}$ and $g_{m2}$ and output admittances $g_{01}$ and $g_{02}$, respectively. In this equivalent circuit it is further assumed that the first and second input signals $S_1$ and $S_2$ are of sufficiently high frequency so that the junction capacitance and feedback capacitance of each of first and second transistors $Q_1$ and $Q_2$ are respectively negligible.

When first and second transistors $Q_1$ and $Q_2$ are biased by respective voltages $V_B$ and control voltages $V_C$ so that they are nonconductive, the cut-off impedance of each of these transistors will be considerably larger then the respective resistances $R_1$ and $R_2$ so that first and second input signal $S_1$ and $S_2$ are fed directly to the respective output terminals 4 and 5 without any attenuation due to the opposite channel. That is, the portion of the inventive signal mixing circuit formed of transistors $Q_1$ and $Q_2$, resistor $R_3$, and control voltage $V_C$ is not contributing to the output signals at terminals 4 and 5, respectively.

On the other hand, when control voltage source 3 is varied to reduce control voltage $V_C$ then first and second transistors $Q_1$ and $Q_2$ will be made operative and the voltage level $V_L(S_1)$ of first input signal $S_1$ present at first output terminal 4, and the voltage level $V_R(S_2)$ of second input signal $S_2$ present at second output terminal 5 can be respectively expressed as follows:

$$V_L(S_1) = \frac{r_{e1} + \left\{\dfrac{1}{g_{01}} // \dfrac{r_{b1} + \left(R_3// \left[r_{b2} + h_{fc2}\left\{\dfrac{1}{g_{02}} //(r_{e2} + R_2)\right\}\right]\right)}{h_{fc1}}\right\}}{R_1 + r_{e1} + \left\{\dfrac{1}{g_{01}} // \dfrac{r_{b1} + \left(R_3// \left[r_{b2} + h_{fc2}\left\{\dfrac{1}{g_{02}} //(r_{e2} + R_2)\right\}\right]\right)}{h_{fc1}}\right\}} \dot{S}_1 \qquad 1$$

$$V_R(S_2) = \frac{r_{e2} + \left\{\dfrac{1}{g_{02}} // \dfrac{r_{b2} + \left(R_3// \left[r_{b1} + h_{fc1}\left\{\dfrac{1}{g_{01}} //(r_{e1} + R_1)\right\}\right]\right)}{h_{fc2}}\right\}}{R_2 + r_{e2} + \left\{\dfrac{1}{g_{02}} // \dfrac{r_{b2} + \left(R_3// \left[r_{b1} + h_{fc1}\left\{\dfrac{1}{g_{01}} //(r_{e1} + R_1)\right\}\right]\right)}{h_{fc2}}\right\}} \dot{S}_2 \qquad 2$$

Where $S_1$ and $S_2$ stand for the original DC voltage levels Of the first and second input signals, respectively, and $h_{fc1}$ and $h_{fc2}$ stand for the current amplification factors of first and second transistors $Q_1$ and $Q_2$, respectively, and the symbol $\|$ arranged between two circuit notation symbols represents a parallel circuit combination of the respective circuit elements.

As seen in the equivalent circuit of FIG. 2, the first and second input signals $S_1$ and $S_2$ will also be present at a connecting point C, and the voltage level $V_C(S_1)$ of the first input signal $S_1$ present at connecting point C, and the voltage level $V_C(S_2)$ of the second input signal $S_2$ present at connecting point C can be expressed, respectively, as follows:

Where, as in the above equation, $\|$ placed between two circuit notation symbols represents a parallel combination of the respective circuit elements.

Additionally, voltage level $V_L(S_2)$ of the second input signal $S_2$ present at first output terminal 4 and voltage level $V_R(S_1)$ of the first input signal $S_1$ present at second output terminal 5 can be expressed, respectively, as follows:

$$V_C(S_1) = \frac{\dfrac{1}{g_{01}} // \dfrac{r_{b1} + \left(R_3// \left[r_{b2} + h_{fc2}\left\{\dfrac{1}{g_{02}} //(r_{e2} + R_2)\right\}\right]\right)}{h_{fc1}}}{r_{e1} + \left\{\dfrac{1}{g_{01}} // \dfrac{r_{b1} + \left(R_3// \left[r_{b2} + h_{fc2}\left\{\dfrac{1}{g_{02}} //(r_{e2} + R_2)\right\}\right]\right)}{h_{fc1}}\right\}} \times$$

$$\frac{R_3// \left[r_{b2} + h_{fc2}\left\{\dfrac{1}{g_{02}} //(r_{e2} + R_2)\right\}\right]}{r_{b1} + \left(R_3// \left[r_{b2} + h_{fc2}\left\{\dfrac{1}{g_{02}} //(r_{e2} + R_2)\right\}\right]\right)} \times V_L(S_1) \qquad 3$$

$$V_C(S_2) = \frac{\dfrac{1}{g_{02}} // \dfrac{r_{b2} + \left(R_3// \left[r_{b1} + h_{fc1}\left\{\dfrac{1}{g_{01}} //(r_{e1} + R_1)\right\}\right]\right)}{h_{fc2}}}{r_{e2} + \left\{\dfrac{1}{g_{02}} // \dfrac{r_{b2} + \left(R_3// \left[r_{b1} + h_{fc1}\left\{\dfrac{1}{g_{01}} //(r_{e1} + R_1)\right\}\right]\right)}{h_{fc2}}\right\}} \times$$

$$\frac{R_3// \left[r_{b1} + h_{fc1}\left\{\dfrac{1}{g_{01}} //(r_{e1} + R_1)\right\}\right]}{r_{b2} + \left(R_3// \left[r_{b1} + h_{fc1}\left\{\dfrac{1}{g_{01}} //(r_{e1} + R_1)\right\}\right]\right)} \times V_R(S_2) \qquad 4$$

$$V_L(S_2) = \frac{h_{fc1}\left\{\dfrac{1}{g_{01}} //(r_{e1} + R_1)\right\}}{r_{b1} + h_{fc1}\left\{\dfrac{1}{g_{01}} //(r_{e1} + R_1)\right\}} \times$$

$$\frac{R_1}{R_1 + r_{e1}} \times V_c(S_2)$$

$$V_R(S_1) = \frac{h_{fc2}\left\{\dfrac{1}{g_{02}} //(r_{e2} + R_2)\right\}}{r_{b2} + h_{fc2}\left\{\dfrac{1}{g_{02}} //(r_{e2} + R_2)\right\}} \times$$

$$\frac{R_2}{R_2 + r_{e2}} \times V_c(S_1)$$

Thus, a combined or blended signal, which is produced from the first input signal $S_1$ having a level $V_L(S_1)$ and the second input signal $S_2$ having a level $V_L(S_2)$ mixed with each other, is obtained at first output terminal 4, and a second combined or blended signal, which is produced from the second input signal $S_2$ having a voltage level $V_R(S_2)$ and the first input signal $S_1$ having a voltage level $V_R(S_1)$ combined with each other, is present at second output terminal 5.

When the control voltage $V_C$ is varied, the equivalent circuit parameters, as shown in FIG. 2, will vary accordingly, that is, the emitter resistances $r_{e1}$ and $r_{e2}$ will change as will the various other parameters. Thus, the first input signal $S_1$ present at first output terminal 4 and second input signal $S_2$ present at output terminal 5 will also vary in level in proportion to the variation in the level of the control voltage $V_C$, and both the second input signal $S_2$ present at first output terminal 4 and the first input signal $S_1$ present at second output terminal 5 will vary in level in inverse proportion to the variation in the level of control voltage $V_C$. In this situation, because the mixing or blending ratio of the first signal $S_1$ to the second signal $S_2$ and the mixing or blending ratio of the second signal $S_2$ to the first signal $S_1$ is determined in accordance with the ratio of the emitter resistance $r_{e1}$ to resistance element $R_1$, the ratio of the emitter resistance $r_{e2}$ to the resistance element $R_2$, the relationship between the values of the current amplification factors $h_{fc1}$ and $h_{fc2}$, the values of the AC impedance of resistance $R_3$ and so on, with the control voltage $V_C$ assumed to have a certain constant value, the level of the combined first and second signals $S_1$ and $S_2$ present at first output terminal 4 can be independently determined, and the level of the second and first signals $S_2$ and $S_1$ present at second output terminal 5 can also be determined independently. Additionally, the voltage levels of the first and second signals $S_1$ and $S_2$ present at the respective output terminals 4 and 5 can be made to vary gradually and continuously in response to variations of the control voltage $V_C$, as represented by the above equations.

In FIG. 3 a conventional FM stereo receiver is shown in block diagram form that is suitable for receiving broadcast FM stereo signals and to which is connected a signal mixing circuit formed in accordance with the embodiment shown in FIG. 1. The apparatus formed according to FIG. 3 will produce a pair of audio output signals each of which is obtained by mixing left and right channel audio output signals and which provides improved S/N ratio when the field strength of the received FM stereo signal is weakened relative to the normal desired signal strength for the FM stereo receiver. In this embodiment, the broadcast FM stereo signal is received by an antenna 11 and fed to a conventional receiver "front end" circuit 12, in which it is frequency down-converted to an FM intermediate frequency (IF) signal, which is supplied in turn to an IF amplifier 13. The amplified IF signal is fed to an FM detector 14 in which it is frequency demodulated, and the demodulated signal is then fed to a stereo detector 15 which separates the left and right channel audio output signals $S_L$ and $S_R$, respectively, from the frequency-demodulated IF signal. The left and right channel audio output signals $S_L$ and $S_R$ are fed to a signal mixing circuit 6, which is constructed in accordance with the embodiment of the present invention as shown in FIG. 1, and, specifically, the left channel audio output signal $S_L$ is fed to a left input terminal $6_a$ and the right channel audio output signal $S_R$ is fed to a right input terminal $6_b$. Signal mixing circuit 6 includes control terminal $6_c$ to which is connected resistor $R_3$ and the controllable voltage source 3, which generates variable control voltage $V_C$. Signal mixing circuit 6 also has a biasing terminal 7 to which is connected a biasing voltage $V_B$, which provides the bias voltage on the emitters of the first and second transistors $Q_1$ and $Q_2$ through respective resistors $R_5$ and $R_6$.

In operation of the FM receiver of FIG. 3, if it is assumed that the control voltage $V_C$ is reduced in voltage level at a time when the field strength of the FM stereo signal received at antenna 11 becomes weaker, the voltage levels of the left and right channel audio output signals $S_L$ and $S_R$ appearing respectively at the first and second output terminals 4 and 5 will also be reduced and, simultaneously, the left and right channel audio output signals $S_L$ and $S_R$ will be fed respectively to the second and first output terminals 5 and 4 to be mixed with the reduced right and left channel audio output signals $S_R$ and $S_L$, respectively. Thus, blended audio output signals, produced by mixing the channel audio output signals $S_L$ and $S_R$ with each other, are obtained at first and second output terminals 4 and 5, respectively, in which the noise components that would be normally contained in the left and right channel audio output signals $S_L$ and $S_R$ are mutually cancelled out and, as a result, each of the blended audio output signals has an improved S/N ratio. Cancellation will occur in signals that are synchronized and out of phase by one-half period, as normally present in such stereo separated signals.

Referring to FIG. 4, another example of an FM receiver having the inventive mixing circuit 6 employed therewith is shown, in which an amplitude detector 16 is provided in place of control voltage source 3 in the embodiment of FIG. 3. The remainder of the circuit construction is substantially the same as in the embodiment of FIG. 3. Amplitude detector 16 is provided with an input connected to the output of IF amplifier 13 and produces an output signal which varies in voltage level in accordance with the detected amplitude, and this output voltage represents control voltage $V_C$ fed to terminal $6_c$ of signal mixing circuit 6. Accordingly, amplitude detector 16 produces an output voltage level in accordance with the detected amplitude of the IF, signal which is in direct proportion to the field strength of the broadcast FM stereo signal as received at antenna 11.

Accordingly, in the operation of the embodiment of FIG. 4, control voltage $V_C$ fed in at control terminal $6_c$ will decrease in accordance with a decrease in signal strength of the received FM stereo signal and when such received signal field strength is accordingly decreased the levels of the left and right channel audio output signals $S_L$ and $S_R$ fed respectively to output terminals 4 and 5 will be reduced gradually, so that noise components contained therein are suppressed and the mixing operation of the left and right channel audio output signals $S_L$ and $S_R$ with each other is carried out in order to cancel noise components contained in both the left and right channel stereo audio output signals $S_L$ and $S_R$ and thereby to produce a pair of blended audio output signals at first and second output terminals 4 and 5 having improved S/N ratio.

It is noted that while a pair of PNP transistors are employed in the above embodiments as first and second transistors $Q_1$ and $Q_2$, the present invention applies equally to the use of NPN transistors, in which case the collectors of NPN transistors would be connected to the connecting points between resistor $R_1$ and output terminal 4 and resistance $R_2$ and second output terminal 5, respectively, and the emitters of the NPN transistors would be connected together to relative ground potential, in accordance with the AC inhibition as described hereinabove.

FIG. 5 is a further embodiment of an FM stereo receiver having the inventive signal mixing circuit added thereto, in which the signal mixing circuit 6 is substantially identical with that represented in FIG. 1, with the exception of the addition of two capacitors. Specifically, a capacitor $C_1$ is connected between the emitter of first transistor $Q_1$ and resistor $R_1$, and a capacitor $C_2$ is connected between the emitter of second transistor $Q_2$ and resistor $R_2$. The capacitance values of capacitors $C_1$ and $C_2$ are selected so as to provide a sufficiently low impedance to a signal having a frequency above 2 KHZ, for example. As in the signal mixing circuit of FIG. 3, the left channel audio signal $S_L$ is fed into signal mixing circuit 6 at terminal $6a$ and the right channel audio output signal $S_R$ is fed in at input terminal $6b$.

An equivalent circuit of mixing circuit 6 of FIG. 5 is shown in FIG. 6, in which it is assumed that first and second transistors $Q_1$ and $Q_2$ have the same small-signal parameters as those described in connection with the circuit of FIG. 1, and the impedances of capacitors $C_1$ and $C_2$ are given by $X_{C1}$ and $X_{C2}$, respectively. The equivalent circuit of FIG. 6 is based upon the case where each of the left and right channel audio output signals $S_L$ and $S_R$ is at its maximum frequency so that junction capacitance and feedback capacitance of each of the first and second transistors $Q_1$ and $Q_2$ can be assumed to be substantially negligible.

In operation of the circuit of FIGS. 5 and 6, when first and second transistors $Q_1$ and $Q_2$ are biased by DC voltage $V_B$ and control voltage $V_C$ so as to be nonconductive, the impedance between first output terminal 4 and relative ground potential is substantially greater than resistance $R_1$ and, similarly, the impedance between second output terminal 5 and relative ground potential is substantially greater than resistance $R_2$, so that the left and right channel audio output signals $S_L$ and $S_R$ are fed to the respective output terminals without be attenuated by the signals in the other channel, thereby forming audio output signals $S_L'$ and $S_R'$, respectively.

On the other hand, when control voltage $V_C$ is reduced so that first and second transistors $Q_1$ and $Q_2$ are biased to be operative or conductive, signal level $S_d(S_L)$ of the left channel audio output signal $S_L$ that is present at output terminal 4 and signal level $S_e(S_R)$ of the right channel audio output signal $S_R$ that is present at the second output terminal 5 can be expressed, respectively, as follows:

$$S_d(S_L) = \frac{X_{c1} + r_{e1} + \left\{ \dfrac{1}{g_{01}} // \dfrac{r_{b1} + \left( R_3 // \left[ r_{b2} + h_{fc2}\left( \dfrac{1}{g_{02}} //(r_{e2} + X_{c2} + R_2) \right) \right] \right)}{h_{fc1}} \right\}}{R_1 + X_{c1} + r_{e1} + \left\{ \dfrac{1}{g_{01}} // \dfrac{r_{b1} + \left( R_3 // \left[ r_{b2} + h_{fc2}\left( \dfrac{1}{g_{02}} //(r_{e2} + X_{c2} + R_2) \right) \right] \right)}{h_{fc1}} \right\}} \dot{S}_L \quad 7$$

$$S_e(S_R) = \frac{X_{c2} + r_{e2} + \left\{ \dfrac{1}{g_{02}} // \dfrac{r_{b2} + \left( R_3 // \left[ r_{b1} + h_{fc1}\left( \dfrac{1}{g_{01}} //(r_{e1} + X_{c1} + R_1) \right) \right] \right)}{h_{fc2}} \right\}}{R_2 + X_{c2} + r_{e2} + \left\{ \dfrac{1}{g_{02}} // \dfrac{r_{b2} + \left( R_3 // \left[ r_{b1} + h_{fc1}\left( \dfrac{1}{g_{01}} //(r_{e1} + X_{c1} + R_1) \right) \right] \right)}{h_{fc2}} \right\}} \dot{S}_R \quad 8$$

where $S_L$ and $S_R$ represent the original signal levels of left and right channel audio output signals $S_L$ and $S_R$, respectively, $h_{fc1}$ and $h_{fc2}$ represent the current amplification factors of the first and second transistors $Q_1$ and $Q_2$, respectively, and $\|$ represents the parallel combination of the corresponding circuit elements represented in FIG. 6.

The left and right channel audio output signals $S_L$ and $S_R$ are also present at connecting point C, and the level $S_C(S_L)$ of the left channel audio output signal $S_L$ present at connecting point C, and the level $S_C(S_R)$ of the right Channel audio output signal $S_R$ present at connecting point C can be expressed, respectively, as fllows:

$$S_C(S_L) = \cfrac{\cfrac{1}{g_{01}} // \cfrac{r_{b1} + \left(R_3// \left[r_{b2} + h_{fc2}\left\{\cfrac{1}{g_{02}} //(r_{e2} + X_{c2} + R_2)\right\}\right]\right)}{h_{fc1}}}{X_{c1} + r_{e1} + \left\{\cfrac{1}{g_{01}} // \cfrac{r_{b1} + \left(R_3// \left[r_{b2} + h_{fc2}\left\{\cfrac{1}{g_{02}} //(r_{e2} + X_{c2} + R_2)\right\}\right]\right)}{h_{fc1}}\right\}} \times$$

$$\cfrac{R_3// \left[r_{b2} + h_{fc2}\left\{\cfrac{1}{g_{02}} //(r_{e2} + X_{c2} + R_2)\right\}\right]}{r_{b1} + \left(R_3// \left[r_{b2} + h_{fc2}\left\{\cfrac{1}{g_{02}} //(r_{e2} + X_{c2} + R_2)\right\}\right]\right)} \times S_d(S_L)$$ (9)

$$S_C(S_R) = \cfrac{\cfrac{1}{g_{02}} // \cfrac{r_{b2} + \left(R_3// \left[r_{b1} + h_{fc1}\left\{\cfrac{1}{g_{01}} //(r_{e1} + X_{c1} + R_1)\right\}\right]\right)}{h_{fc2}}}{X_{c2} + r_{e2} + \left\{\cfrac{1}{g_{02}} // \cfrac{r_{b2} + \left(R_3// \left[r_{b1} + h_{fc1}\left\{\cfrac{1}{g_{01}} //(r_{e1} + X_{c1} + R_1)\right\}\right]\right)}{h_{fc2}}\right\}} \times$$

$$\cfrac{R_3// \left[r_{b1} + h_{fc1}\left\{\cfrac{1}{g_{01}} //(r_{e1} + X_{c1} + R_1)\right\}\right]}{r_{b2} + \left(R_3// \left[r_{b1} + h_{fc1}\left\{\cfrac{1}{g_{01}} //(r_{e1} + X_{c1} + R_1)\right\}\right]\right)} \times S_e(S_R)$$ (10)

Proceeding with the circuit analysis of the equivalent circuit of FIG. 6, the level $S_d(S_R)$ of the right channel audio output signal $S_R$ that will be present at first output terminal 4, and the level $S_e(S_L)$ of the left channel audio output signal $S_L$ that will be present at second output audio terminal 5 can be expressed, respectively, as follows:

$$S_d(S_R) = \cfrac{h_{fc1}\left\{\cfrac{1}{g_{01}} //(r_{e1} + X_{c1} + R_1)\right\}}{r_{b1} + h_{fc1}\left\{\cfrac{1}{g_{01}} //(r_{e1} + X_{c1} + R_1)\right\}} \times$$ (11)

$$\cfrac{R_1}{R_1 + X_{c1} + r_{e1}} \times S_c(S_R)$$

$$S_e(S_L) = \cfrac{h_{fc2}\left\{\cfrac{1}{g_{02}} //(r_{e2} + X_{c2} + R_2)\right\}}{r_{b2} + h_{fc2}\left\{\cfrac{1}{g_{02}} //(r_{e2} + X_{c2} + R_2)\right\}} \times$$ (12)

$$\cfrac{R_2}{R_2 + X_{c2} + r_{e2}} \times S_c(S_L)$$

Thus, as seen from the above equations, a blended signal that is made up of left channel audio output signal $S_L$ having level $S_d(S_L)$ and a portion of the right channel audio output signal $S_R$ having a level $S_d(S_R)$ is obtained at output terminal 4 as the audio output signal $S_L'$. The signal component having a level $S_d(S_L)$ has a reduced high-frequency component because the impedance $X_{C1}$ is chosen to be relatively low to such high frequencies and such signals are passed by capacitor $C_1$. Similarly, there will be present a high-frequency component of the right channel audio output signal $S_R$, because the impedances $X_{C2}$ and $X_{C1}$ presented to such high frequencies are relatively low. A blended signal which is comprised of the right channel audio output signal $S_R$ having a level $S_e(S_R)$ and a portion of the left channel audio output signal $S_L$ having level $S_e(S_L)$ is obtained at output terminal 5 as audio output signal $S_R'$. The signal contributed by the right channel audio output signal having a level $S_e(S_R)$ will have reduced high-frequency components because the impedance $X_{C2}$ is relatively low at such high frequencies and will have a high frequency component of the left channel audio output signal $S_L$ because the impedances of $X_{C1}$ and $X_{C2}$ are relatively low at such high frequencies. Now, when the control voltage $V_C$ is varied thereby changing emitter resistances $R_{e1}$ and $R_{e2}$ and other small-signal model parameters of transistors $Q_1$ and $Q_2$, each of the high-frequency components of the left channel audio output signal $S_L$ present at the first output terminal 4 and the high-frequency components of the right channel audio output signal $S_R$ present at second output terminal 5 will vary in level in proportion to the variation in the level of the control voltage $V_C$. Moreover, each of the high-frequency components of the right channel audio output signal $S_R$ present at first output terminal 4 and the high-frequency components of the left channel audio output signal $S_L$ present at second output terminal 5 will vary in level in inverse proportion to the variation in the level of the control voltage $V_C$.

Thus, in the operational situation where control voltage $V_C$ is reduced in level because the field strength of the received FM stereo broadcast signal becomes weaker, the levels of the high-frequency components to the left and right channel audio output signals $S_L$ and $S_R$ present at the respective first and second output terminals 4 and 5 will be reduced, thereby suppressing the noise normally present in these high-frequency components. Simultaneously with such operation, the high-frequency components of the left and right channel audio output signals $S_L$ and $S_R$ are transmitted to the second and first output terminals 4 and 5, respectively, there to be mixed with the reduced high-frequency components of the right and left channel audio output signals $S_R$ and $S_L$, respectively, whereby noise present in the high-frequency components in the left and right channel audio output signals $S_L$ and $S_R$ of the same phase is cancelled. As a result, each of the blended audio output signals $S_L'$ and $S_R'$ present at the first and second output terminals 4 and 5 has an improved S/N ratio.

Figure 7:
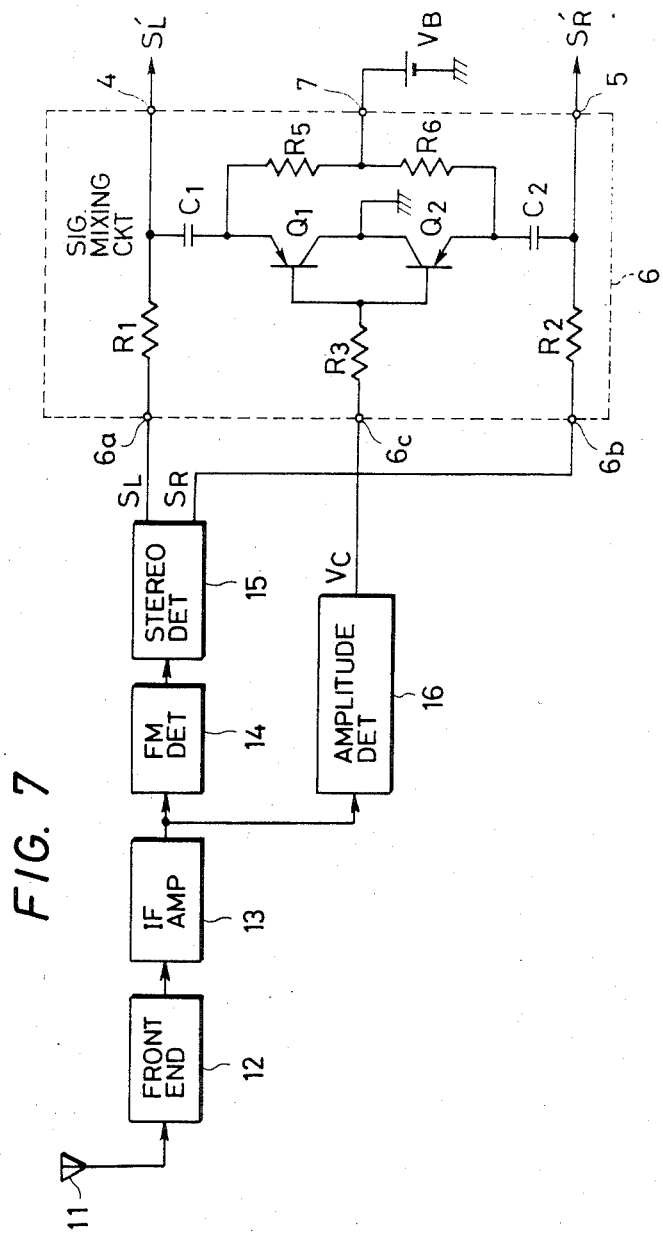
FIG. 7 is a block diagram of an FM stereo receiver to which is connected the noise reducing circuit shown in FIG. 5 by way of an amplitude detector.

FIG. 7 represents another embodiment of an FM receiver suitable for receiving broadcast FM stereo signals that is improved by the addition of the signal mixing circuit 6, as shown in the embodiment of FIG. 6, for example. In the embodiment of FIG. 7, amplitude detector 16 is employed in place of variable control voltage source 3 used in the embodiment of FIG. 5, with the remainder of the circuit is constructed as exactly as in such previous embodiment. Amplitude detector 16 is connected to the output of IF amplifier 13 and produces an output voltage which will vary in direct proportion to the intensity of the electrical field strength of the received broadcast FM stereo signal received at antenna 11, and feeds such output voltage to control terminal 6c of signal mixing circuit 6, as the control voltage $V_C$. In the operation of the embodiment of FIG. 7, when the field strength of the received broadcast FM stereo signal decreases the levels of the high-frequency components of the left and right channel audio output signals $S_L$ and $S_R$, fed respectively to the first and second output terminals 4 and 5, will be reduced so that noise contained therein is suppressed. Moreover, the levels of the high-frequency components of the right and left channel audio output signals $S_R$ and $S_L$ fed to the first and second output terminals 4 and 5, respectively, to be mixed with the reduced high-frequency components of the left and right channel audio output signals $S_L$ and $S_R$ are increased so that noise contained in each of the high-frequency components is cancelled out.

As discussed above, in any of the signal mixing circuits shown for example in FIGS. 5 and 7, it is possible to employ a pair of NPN transistors in place of the PNP transistors utilized in the embodiments shown therein. Additionally, in the actual operation of the inventive mixing circuit it may be advantageous to employ a number of such circuits, such as shown for example in FIG. 4, in a series connection and being fed with the separated left and right channel audio signals. In an embodiment in which an FM stereo receiver is provided with two or more of the inventive signal mixing circuits connected in series, the high-frequency reducing characteristics of such embodiment are represented in FIG. 8, in which the ordinate represents the level of a left or right channel audio output signal (L) and the abscissa represents the operational frequency in KHZ.

The high-frequency blending characteristics provided by the present invention, expressed as a function of stereo channel separation, is graphically represented in FIG. 9, in which the ordinate axis represents the level of left or right channel audio output signal (SP) and the abscissa represents frequency in KHZ. In examining variations in the control voltage $V_C$ in the graphs of FIGS. 8 and 9 it is seen that the following relationship is satisfied:

$$V_1 > V_2 > V_3 > V_4 > V_5 > V_6 > V_7. \qquad (13)$$

Accordingly, from the above and FIGS. 8 and 9 it is seen that channel separation decreases as the signal strength of the received FM stereo signal decreases or weakens and more of the signal from the other channel is blended to reduce the adverse effects of noise and to improve S/N ratio.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A signal mixing circuit receiving two input signals and producing two blended output signals therefrom, comprising:
    control means for producing a variable level control signal;
    a first resistance element connected to one of said two input signals;
    a first current amplifying device having a connection to relative ground potential and being connected between said control means and said first resistance element and being operably responsive to said variable level control signal;
    a second resistance element connected to the other of said two input signals;
    a second current amplifying device having a connection to relative ground potential and being connected between said control means and said second resistance element and being operably responsive to said variable level control signal; and
    whereby a first blended output signal formed of said two input signals is produced at the connection between said first resistance element and said first current amplifying device and a second blended output signal formed of said two input signals is produced at the connection between said second resistance element and said second current amplifying device.

2. A signal mixing circuit according to claim 1, in which said first and second current amplifying devices comprise respective first and second transistors, each having respective collector electrodes connected to relative ground potential, said first transistor having an emitter electrode connected to said first resistance element and a base electrode connected to said variable level control signal and said second transistor having an emitter electrode connected to said second resistance element and a base electrode connected to said variable level control signal, whereby the collector-emitter resistance of each of said transistors is controlled in response to said variable level control signal connected to the respective base electrodes.

3. A signal mixing circuit according to claim 2, in which said control means includes biasing means for supplying first and second biasing voltages to respective collector electrodes of said first and second transistors.

4. A signal mixing circuit according to claim 3, in which said control means further includes a third resistance element connected to said base electrodes of said first and second transistors, through which said variable level control voltage is supplied to said base electrodes.

5. A signal mixing circuit according to claim 2, in which said first and second current amplifying devices comprise respective first and second transistors each having respective emitter electrodes connected to relative ground potential, said first transistor having a collector electrode connected to said first resistance element and a base electrode connected to said variable lever control signal and said second transistor having a collector electrode connected to said second resistance element and a base electrode connected to said variable level control signal.

6. A signal mixing circuit according to claim 1, further comprising first capacitance means connected between the first resistance means and said first current amplifying device and second capacitance means connected between said second resistance means and said second current amplifying device, whereby said first blended output signal is produced at the connection of said first resistance element and said first capacitance element and said second blended output signal is produced at the connection between said second resistance element and said second capacitance element.

7. A signal mixing circuit according to claim 6, in which said first current amplifying device comprises respective first and second transistors each having respective collector electrodes connected to relative ground potential, said first transistor having a base electrode connected to said variable level control signal and an emitter electrode connected through said first capacitance means to said first resistance element, and said second transistor having a base electrode connected to said variable level control signal and an emitter electrode connected through said second capacitance element to said second resistance element.

8. A signal mixing circuit according to claim 7, in which said control means includes biasing means for supplying first and second biasing voltages to respective collector electrodes of said first and second transistors.

9. A signal mixing circuit for producing left and right channel audio output signals from detected and demodulated left and right channel audio signals produced by an FM stereo receiver, comprising:
control means for producing a variable level control signal;
a first resistance element connected to said left channel audio signal;
a first current amplifying device having a connection to relative ground potential and being connected between said control means and said first resistance element and responsive to said variable level control signal;
a second resistance element connected to said right channel audio signal;
a second current amplifying device having a connection to relative ground potential and being connected between said control means and said second resistance element and being responsive to said variable level control signal; and
whereby said left channel audio output signal formed of a blend of said left and right channel audio signals is produced at the connection between said first resistance element and said first current amplifying device and a right channel audio output signal formed of a blend of said left and right channel audio signals is produced at the connection between said second resistance element and said second current amplifying device.

10. A signal mixing circuit according to claim 9, in which said first and second current amplifying devices comprise respective first and second transistors each having respective collector electrodes connected to relative ground potential, said first transistor having an emitter electrode connected to said first resistance element and a base electrode connected to said variable level control signal and said second transistor having an emitter electrode connected to said first resistance element and a base electrode connected to said variable level control signal.

11. A signal mixing circuit according to claim 10, in which said control means includes biasing means for supplying first and second biasing voltages to respective collector electrodes of said first and second transistors.

12. A signal mixing circuit according to claim 11, in which said control means further includes an amplitude detector means having an input connected to an intermediate frequency amplifier of said FM stereo receiver for producing said variable level control signal in accordance with an amplitude of a broadcast signal received by said FM stereo receiver.

13. A signal mixing circuit according to claim 12, in which said control means further includes a third resistance element connected between the output of said amplitude detector and said base electrodes of said first and second transistors, through which said variable level control voltage is supplied.

14. A signal mixing circuit according to claim 12, further comprising first capacitance means connected between said first resistance element and said emitter of said first transistor and second capacitance means connected between said second resistance element and said emitter electrode of said second transistor, whereby said left channel audio output signal is formed at the connection of said first resistance element and said first capacitance element and said right channel audio output signal is formed at the connection of said second resistance element and said second capacitance element.

15. A signal mixing circuit according to claim 9, in which said first and second current amplifying devices are comprised of respective first and second transistors each having respective emitter electrodes connected to relative ground potential, said first transistor having a collector electrode connected to said first resistance element and a base electrode connected to said variable level control signal, and said second transistor having a collector electrode connected to said second resistance element and a base electrode connected to said variable level control signal.

16. A signal mixing circuit according to claim 15, in which said control means includes biasing means for supplying first and second biasing voltages to respective collector electrodes of said first and second transistors.

17. A signal mixing circuit according to claim 16, in which said control means further includes amplitude detector means having an input connected to an intermediate frequency amplifier of said FM stereo receiver for producing said variable level control signal in response to a signal level in said intermediate frequency amplifier.

18. A signal mixing ciruzit according to claim 17, in which said control means further includes a third resistance element connected to said base electrodes of said first and second transistors and to said output of said amplitude detector for supplying said variable level control signal to said base electrodes of said first and second transistors.

* * * * *